United States Patent [19]
Williams et al.

[11] 3,875,484
[45] Apr. 1, 1975

[54] TRAVELLING FIELD ELECTRIC MOTOR WITH IMPROVED STATOR

[75] Inventors: John Llewellyn Williams, Chester; Ralph James Harte, Wallasey, both of England

[73] Assignee: British Nuclear Fuels Limited, Warrington, Lancashire, England

[22] Filed: Dec. 28, 1973

[21] Appl. No.: 429,210

[30] Foreign Application Priority Data
Jan. 9, 1973 United Kingdom............... 1145/73

[52] U.S. Cl. .......................... 318/220 R, 318/225 R
[51] Int. Cl. ............................................. H02p 1/44
[58] Field of Search ............ 318/205, 207 R, 207 B, 318/220 R, 221 R, 221 D, 225 R, 231

[56] References Cited
UNITED STATES PATENTS
2,474,549   6/1949   Schoeppel.................... 318/220 R
2,706,269   4/1955   Kazan........................... 318/220 R
2,740,932   4/1956   King............................. 318/207 B Primary Examiner—G. Z. Rubinson
Attorney, Agent, or Firm—Larson, Taylor & Hinds

[57] ABSTRACT

An alternating current electric motor has a stator comprising an inductive winding in association with capacitance to ensure that the winding has the characteristics of a transmission line. The rotor of the motor may be of the induction, hysteresis or reluctance type. In one form, the winding of the stator is toroidal, such as gramme ring type, with shunt capacitors at fixed intervals along its length. In an alternative form, a linear motor has a solenoid type stator winding with shunt capacitors at fixed intervals. The invention enables speed to be closely defined without being essentially related to supply frequency.

3 Claims, 5 Drawing Figures

TRAVELLING FIELD ELECTRIC MOTOR WITH IMPROVED STATOR

BACKGROUND OF THE INVENTION

This invention relates to alternating current electric motors. It provides a new form of stator for such motors, which motors have a closely defined speed which is not essentially related to supply frequency.

SUMMARY OF THE INVENTION

The motor stator according to the present invention comprises an inductive winding in association with capacitance so that the winding has the characteristics of a transmission line.

Preferably a stator is formed with a number of successive units each comprising an inductance with a shunt capacitance. The synchronous speed of a motor using such a stator is nominally independent of supply frequency and depends mainly on the value of inductance and capacitance in each unit and the number of units. Thus a motor can be provided which will operate from a single phase supply the frequency of which need not be closely controlled in order to provide a designed speed.

Rotors to operate in conjunction with stators according to the present invention may be of the induction, hysteresis or reluctance type.

The stator is suitable for use in motors supplied from sine wave single-phase supplies, static inverters or frequency multipliers or the motor could be operated from a DC source by the provision of a switch which could either be mechanical or solid state.

In one form of the invention, a rotary motor has, a toroidal stator winding, such as a gramme ring winding, with shunt capacitors connected at fixed intervals along its length. In another form of the invention, a linear motor has a solenoid type stator winding with shunt capacitors at fixed intervals. Such motors require only two wires and thus the danger, known in multiphase systems, of the motor operating with one phase open circuit, is avoided. Typically the stator can have six sections, that is six shunt capacitors and then, if the wavelength of the signal applied to the stator is comparable to the velocity of propagation along two sections of the stator winding, then a travelling magnetic field is set up comprising exactly three full cycles of magnetic field intensity and the intensity at both ends of the stator winding are always equal and thus, a transmission line formed as a circular stator winding performs as an endless component electrically whilst physically it possesses two ends.

As the rotor of a motor having a stator according to the present invention is only aware of the existence of a travelling field it will tend to behave under load like a "conventional" travelling field motor.

DESCRIPTION OF THE DRAWINGS

The invention will now be further described with reference to the accompany drawings in which.

DESCRIPTION OF THE PREFERRED EMBODIMENTS

Figure 1:
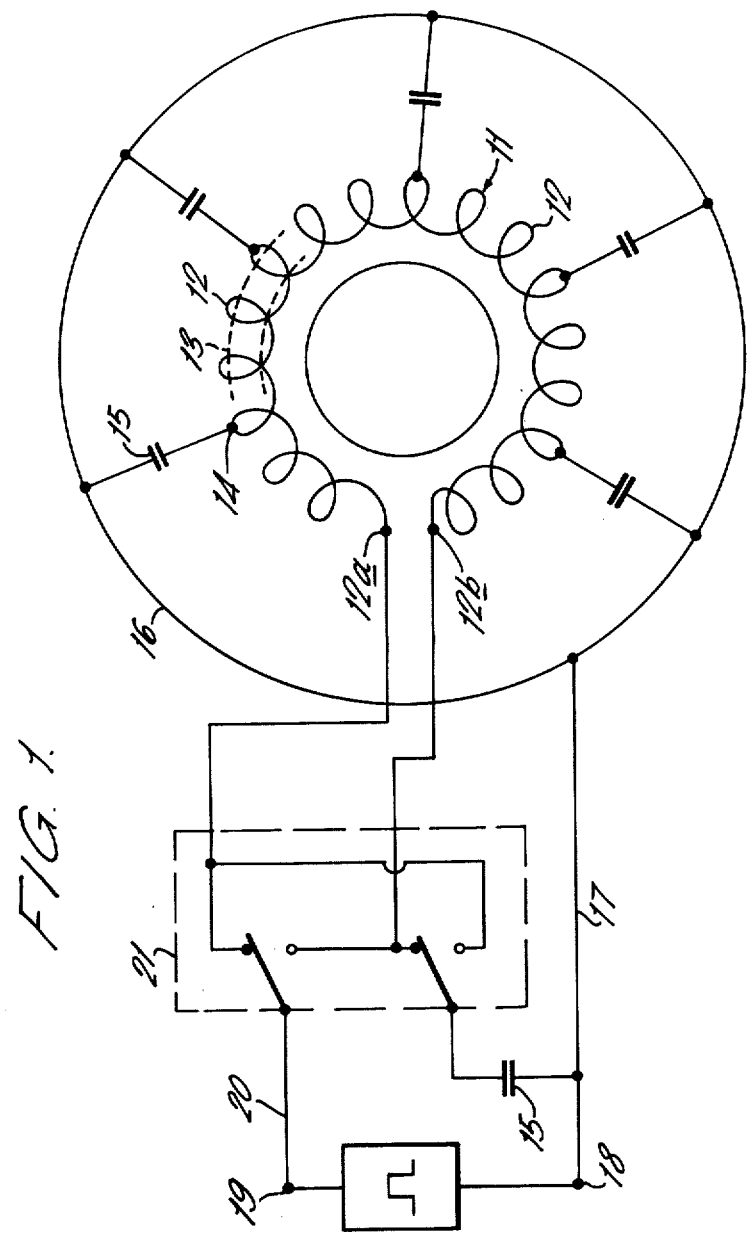
FIG. 1 shows diagrammatically a rotary motor according to the invention.

In FIG. 1 a motor has a rotor 10 and a stator 11. The rotor is not shown or described in detail for the stator imposes no special design on the rotor, which can be of conventional type. The stator 11 comprises a conventional gramme ring winding 12, that is a continuous inductance wound as a toroid or a toroidal core 13 of transformer iron. At six tapping points 14 around the winding 12 shunt capacitors 15 are connected. The capacitors also have a common connector 16, which has a connector 17 to a terminal 18 of a single-phase alternating square-wave current supply. The other terminal 19 of the supply has a connector 20 to a reversing switch 21 and thence to one end 12a or the other end 12b of the winding 12. It is to be observed that one of condensers 15 appears at the one end 12a or the other end 12b according to the position of the reversing switch. In this way reversal of direction of rotation of the rotor can be performed.

The arrangement of winding 12 and capacitors 15 is such that a transmission line is created having six "lumped" inductors each with a "lumped" capacitor. With a 1,000 Hz single phase square wave supply, 1 milli-henry inductance, and 8 micro-farad capacitances a rotor speed of about 60,000 revolutions per minute can be achieved. Speed control can be achieved in a number of ways. In one way, the supply frequency can be changed and the supply voltage kept constant, but this way is not recommended as it can produce a drop in efficiency. In this respect motors according to the invention differ from conventional travelling field motors where, to achieve a speed change with frequency change, it is important to alter supply voltage proportionately to avoid drawing excess current due to inductance changes with frequency. Speed can also be varied by increasing the number of inductance/capacitance sections in the transmission line; by changing the values of inductance and capacitance; or by periodically moving the reversing switch to an intermediate neutral position so that the input is momentarily and periodically removed. Where a reversing switch is not provided an on/off switch can be used for the same purpose. The speed of the motor however cannot be increased above the maximum synchronous speed that would be obtained with a two-pole motor for a particular supply frequency.

In operation, the leading edge of each square wave of the supply sends a travelling wave along the transmission line and the rotor follows this wave. At any supply frequency lower than the maximum determined by the L/C ratio the motor will tend to run at constant speed but this speed will vary slightly with load. In fact, changes in load will tend to change the inductance of the sections of the transmission line. At a supply frequency higher than the maximum determined by the L/C ratio the motor will stall.

Figure 2:
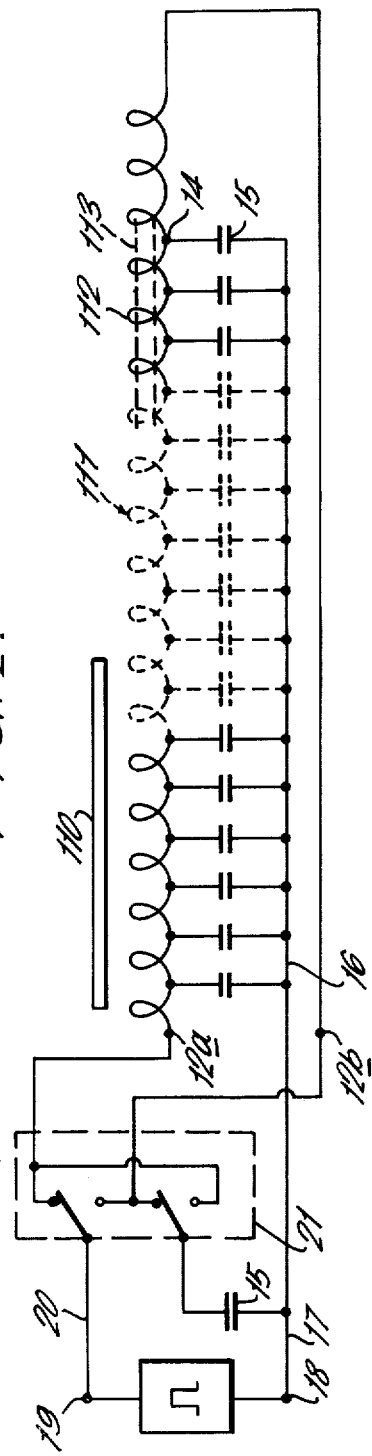
FIG. 2 shows diagrammatically a linear motor according to the invention.

If each section of the transmission line has an AC resistance R, a series inductance L and a shunt capacitance C then the wavelength $\lambda$, velocity V and frequency $f$ of the travelling wave can be expressed, in terms of a constant B, as follows:

$\lambda = 2°\pi/B$ and $V = 2°\pi f/B$ where $B = 0.707 \sqrt{\omega C(R^2+\omega^2 L^2)^{1/2}+\omega^2 LC}$
and $\omega = 2\pi f$ The arrangement of FIG. 2 is fundamentally very similar to that of FIG. 1 with the exception that the stator 111 is now linear, the stator winding 112 and core 113 are linear and the "rotor" is a linear member 110. Other components have identical numbering to that used in FIG. 1.

Figure 3:
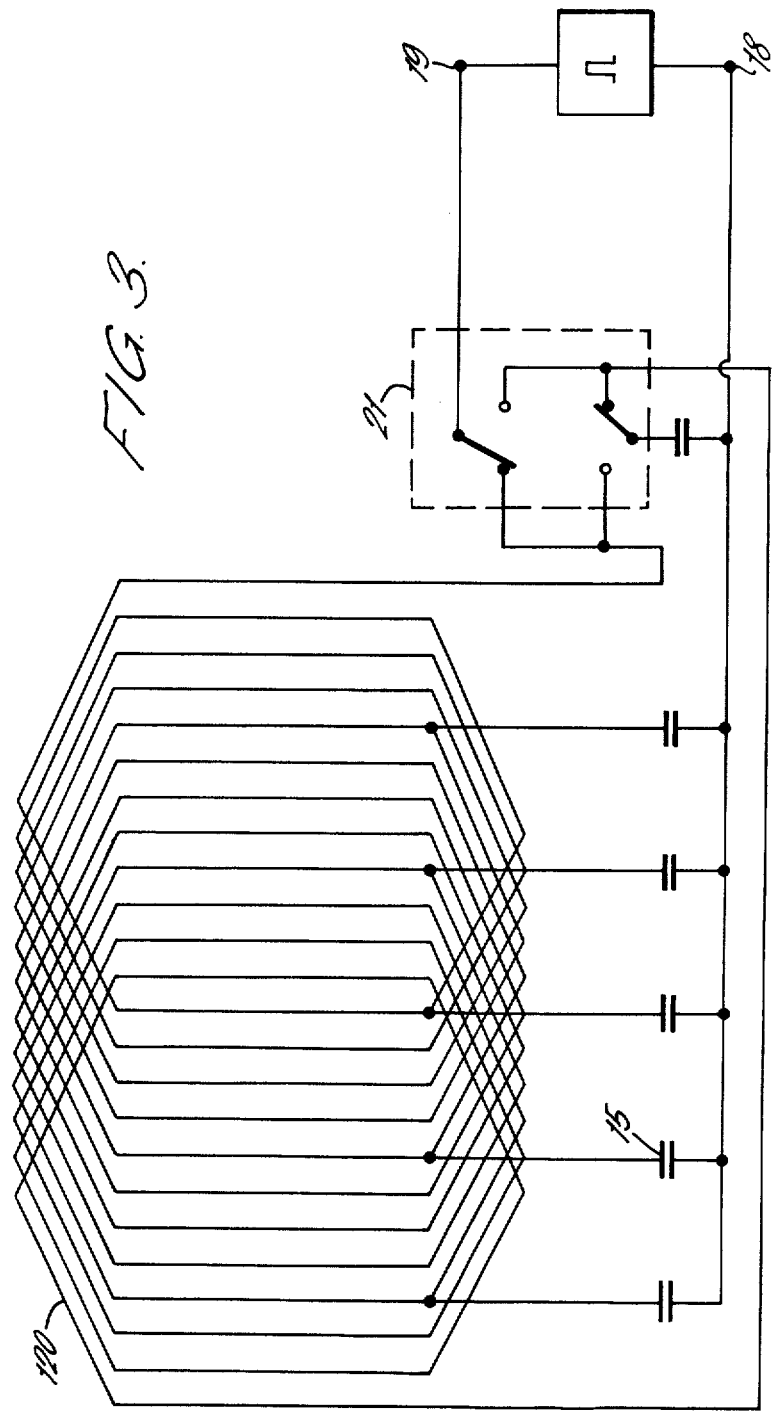
FIG. 3 shows diagrammatically the winding of a slotted stator according to the invention, and FIG. 4A and 4B respectively show open and closed circuit terminations.

In FIG. 3, instead of a gramme ring winding or solenoid as shown respectively in FIGS. 1 and 2, the windings 120 may be fitted into twenty-four stator slots. Other components have identical numbering to that used in FIG. 1.

Figure 4B:
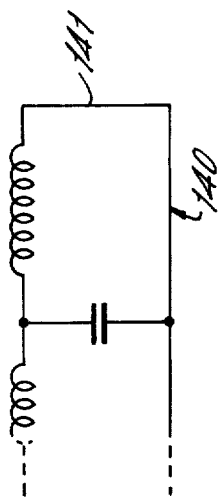
Figure 4A:
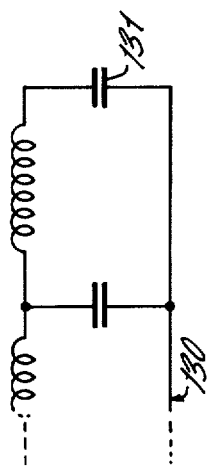

FIG. 4A shows an "open circuit" transmission line 130 and FIG. 4B shows a "closed circuit" transmission line 140, the open circuit being represented by the capacitor 131 and the closed circuit by the connection 141.

In order to provide speed control, capacitors could be switched in parallel with each of the capacitors 15. Solid state switches could be used, fired from a single source.

We claim:

1. In an electric drive system including an alternating current electric motor having a stator, a stator core and a rotor arranged to be driven by energization of the stator winding from a single-phase alternating current supply, a stator arrangement comprising an inductive stator winding having two ends and an even number of tapping points at substantially equi-spaced intervals along its length, the same even number of capacitors associated with the inductive stator winding, a common connector, means for connecting each capacitor in parallel with a section of the winding between a respective tapping point and the common connector, and first and second electric current supply terminals, said first terminal being connected to one end of the inductive stator winding and said second terminal being connected to the common connector; the inductive winding, the capacitors, and the frequency of the supply being so arranged and matched that, in operation, the wavelength of the winding current is equal to an even multiple of the said sections such that a travelling magnetic field is set up in the stator and the magnetic intensities at the two ends of the winding are equal.

2. An electric drive system as claimed in claim 1, wherein the inductive stator winding comprises a gramme ring winding.

3. An electric drive system as claimed in claim 1, wherein the capacitor connected to the tapping point farthest from the input terminal to the winding is replaced by a closed circuit connection.

* * * * *